(No Model.)
C. B. MILLER.
COMBINED WAGON AND VELOCIPEDE.
No. 545,517. Patented Sept. 3, 1895.
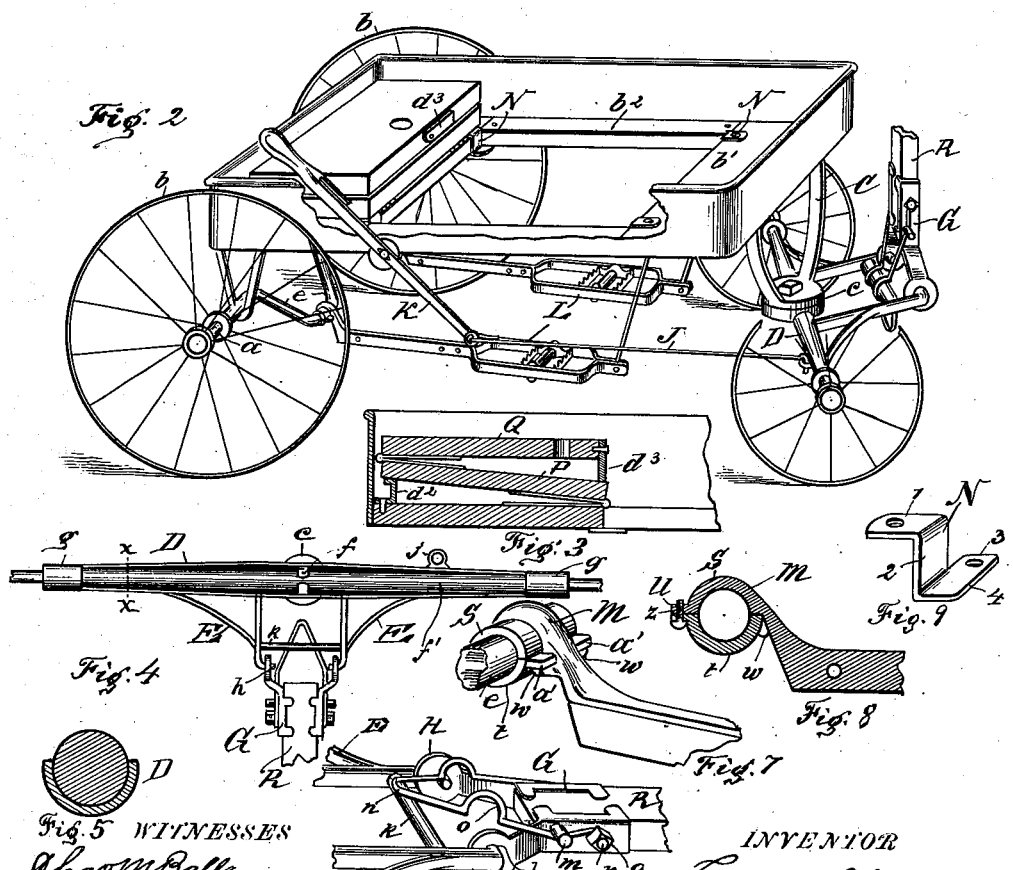

UNITED STATES PATENT OFFICE.

CHARLES B. MILLER, OF CANTON, OHIO.

COMBINED WAGON AND VELOCIPEDE.

SPECIFICATION forming part of Letters Patent No. 545,517, dated September 3, 1895.

Application filed December 3, 1894. Serial No. 530,645. (No model.)

*To all whom it may concern:*

Be it known that I, CHARLES B. MILLER, a citizen of the United States, and a resident of Canton, county of Stark, State of Ohio, have invented a new and useful Improvement in a Combined Wagon and Velocipede, of which the following is a full, clear, and exact description, reference being had to the accompanying drawings, making part of this specification.

My invention relates to improvements in a combined wagon and velocipede; and it consists in certain features of construction and combination of parts, as will be hereinafter described and claimed.

Figure 1 of the accompanying drawings is a perspective illustrating my invention. Fig. 2 is a similar view showing the bottom of the wagon-bed folded back onto the rear portion of the wagon-bed bottom and forward on itself to form a seat raised above a level of the bottom of the bed. Fig. 3 is a section transverse the seat, showing devices by which the seat may be further elevated. Fig. 4 is a plan view of the under side of the front axle, showing the hounds, the manner of securing them to the axle, and the tongue to the hounds. Fig. 5 is a transverse section through the front axle on a line from $x$ to $x$. Fig. 6 is a perspective of the front portion of the hounds, the tongue-socket with a fragment of the tongue, and the spring by which the tongue is held in vertical position. Fig. 7 is a similar view of the rear end of the foot-pedal. Fig. 8 is a longitudinal vertical sectional view of the same. Fig. 9 is an angle-clip or corner-iron that serves to support the fixed bottom boards as well as a support for the folding board that forms the seat.

The wagon is constructed substantially as shown in Fig. 1, having a body A of parallelogram form, to the rear end of which is secured brackets or pendants B, in which is journaled the rear axle $a$, on the outer end of which is secured one of the wheels $b$, the other adapted to turn on the spindle end of the axle, but one of the wheels to serve as a driver, for reasons that need no explanation. The cranked portions $e$ of the axle may be oppositely disposed, or at such angles to each other as may be preferred.

At the front end of the wagon-body is provided a dependent bracket C, having at its lower portion a fifth-wheel $d$, adapted to a similar wheel $c$, and on the front axle-support D, below the said fifth-wheel and integral with the support, are provided fingers $f$, that grasp the central portion of the axle $f'$, and, at the ends of the support, sleeves $g$, that embrace the axle at a point near to the spindle, thus forming a light, strong, and rigid axle. From the front side of the support D are provided forwardly-projected hounds E, having inwardly-projected trunnions $h$, by which the tongue-socket G is pivotally secured to the hounds.

The two sides of the hounds are connected by a cross-bar $k$, that serves to hold the tongue in vertical position, as shown in Fig. 2, when the wagon is used as a velocipede, and at the rear side of the axle-support D is provided an eye $j$, into which the front end of the link J is hooked, by which the guide-lever K is secured to the axle.

The tongue-socket G is provided at its rear end with an eye $l$, that is adapted to embrace the trunnion on the hounds E. The front portion is in socket form, to receive the rear end of the tongue, and at the sides of the socket are studs $m$. A spring or yielding latch H is provided, having a rear extension $n$, that projects over the cross-bar $k$, and an open side socket $o$. The front ends or prongs of the spring are passed under the studs $m$ and secured about the tongue-bolt $p$ by the nut $q$. Pedals, as L, are provided, as shown, the front ends of which are supported on links $r$, the rear ends journaled to the cranks $e$ by the journal-box M, (shown in Figs. 7 and 8,) which comprises two parts $s$ and $t$, that embrace the crank-journals, part $s$ of the box having at its rear portion a lug $u$ and at its front side lugs $w$. The cap portion $t$ has a rearwardly-projected lug to correspond with the lug $u$ on part $s$ and forwardly-projected lugs $a'$, that rest upon the lugs $w$. A screw-bolt $z$ secures the parts in operative position.

To secure the bottom boards $b'$ and $b^2$ in operative position, I have provided a clip N of the form shown in Fig. 9, having a rearwardly-projected portion 1, that rests on and is secured to the boards $b'$, a middle portion 2, that passes down at the edge of the board, and a portion 3, that is projected out from the middle portion 2 and to one side, and secured to the side-board $b^2$; the inside portion 4 to serve as a support for the removable bottom boards P and Q.

To turn the wagon into a velocipede, the tongue R is turned up, as shown in Fig. 2. The spring H, grasping the cross-bar $k$, will hold the tongue in vertical position. The board P is folded back in the bottom board $b'$, and the board Q is folded forward on the board P, as shown in Fig. 2, to form a seat above the bottom of the body, and to still further raise the seat to adapt the velocipede to a larger child, a support, as $d^2$, (see Fig. 3,) is provided and secured to the rear portion of the rear bottom board $b'$, as shown in Fig. 1, that may be turned out, as shown in Fig. 3, to support the board P a distance from the bottom, and a clip, as $d^3$, is secured to the front edge of the board Q, (see Fig. 2) that may be turned into position shown in Fig. 3, the lower end resting on the edge of the board P, thus forming a support for the front edge of the board Q, in raised position. (Shown in Fig. 3.)

To operate the velocipede the operator is seated upon the seat shown, with feet on the pedals, which are alternately pressed forward and down to rotate the crank-shaft and drive-wheel, and to guide the velocipede the upper end of the hand-lever K is moved forward or back to turn the front axle to give the front wheel the desired inclination, and when used as a wagon the seat-boards are folded down, as shown in Fig. 1, into the opening in the bottom of the wagon-body, (shown in Fig. 2,) and are supported on the clip N.

Having thus fully described the nature and object of my invention, what I claim is—

1. The combination in a combined child's wagon and velocipede as herein described, of a folding section of the bottom of the body, formed of the boards P and Q, hinged together and to the bottom board $b'$, the board P adapted to be folded back and down on the rear board $b'$, and the board Q forward and down on the board P, and means for spacing the boards apart to increase the height of the seat formed by said boards, substantially as described and for the purpose set forth.

2. The combination in a combined wagon and velocipede as herein described, of a body A, having a portion of the bottom of the body adapted to fold back upon the rear portion $b'$, and forward on itself, the support $d^2$ and clip $d^3$, whereby the boards P and Q may be spaced from the bottom of the wagon and apart, to provide a raised seat, substantially as described and for the purpose set forth.

3. The combination with the fixed bottom boards, $b'$ $b'$, of the boards, P and Q, hinged together and one hinged to one of the fixed bottom boards, means for spacing the boards apart to increase the height of the seat formed thereby, and clips, N, each having a horizontal portion, 1, to be secured to the fixed board, $b'$, a vertical part, 2, to engage the edge thereof, a lateral portion, 4, to support the hinged board, and an extension, 3, to be secured to the side boards, $b^2$, of the body, substantially as set forth.

4. The combination with the body of the vehicle having a folding bottom formed of boards, P and Q, hinged together and to the bottom board, $b'$, the board, P, adapted to be folded back and down on the rear board, $b'$, and the board, Q, forward and down on the board, P, and means for spacing the boards apart to increase the height of the seat formed by said boards, of pedals supported beneath the bottom and connected with the wheels of the body, whereby the vehicle may be driven, substantially as set forth.

In testimony whereof I have hereunto set my hand this 24th day of November, A. D. 1894.

CHARLES B. MILLER.

Witnesses:
W. K. MILLER,
CHAS. R. MILLER.